US009794912B2

United States Patent
Kim et al.

(10) Patent No.: US 9,794,912 B2
(45) Date of Patent: *Oct. 17, 2017

(54) METHOD AND APPARATUS FOR TRANSMITTING/RECEIVING PACKET IN WIRELESS COMMUNICATION SYSTEM

(71) Applicant: ELECTRONICS AND TELECOMMUNICATIONS RESEARCH INSTITUTE, Daejeon (KR)

(72) Inventors: Yun-Joo Kim, Suwon-si (KR); Sok-Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/237,000

(22) Filed: Aug. 15, 2016

(65) Prior Publication Data

US 2016/0353411 A1 Dec. 1, 2016

Related U.S. Application Data

(63) Continuation of application No. 14/882,712, filed on Oct. 14, 2015, now Pat. No. 9,445,306, which is a
(Continued)

(30) Foreign Application Priority Data

Mar. 12, 2010 (KR) .................. 10-2010-0022439

(51) Int. Cl.
*H04W 4/00* (2009.01)
*H04W 72/00* (2009.01)
(Continued)

(52) U.S. Cl.
CPC .......... *H04W 72/005* (2013.01); *H04L 45/74* (2013.01); *H04L 69/22* (2013.01); *H04W 4/06* (2013.01);
(Continued)

(58) Field of Classification Search
CPC . H04W 72/005; H04W 72/0406; H04W 4/06; H04W 28/06; H04L 69/22; H04L 45/74
See application file for complete search history.

(56) References Cited

U.S. PATENT DOCUMENTS 7,352,718 B1 4/2008 Perahia et al.
7,529,178 B1 5/2009 Loc
(Continued)

FOREIGN PATENT DOCUMENTS

JP 2009-005409 A 1/2009
KR 10-2002-0049790 A 6/2002
(Continued)

OTHER PUBLICATIONS 802.11 Working Group of 802 Committee, "Wireless LAN Medium Access Control (MAC) and Physical Layer (PHY) specifications: Enhancements for Higher Throughput", IEEE, p802.11n/D1.0, Mar. 2006, IEEE, New York, NY (8 pages in English).
(Continued)

*Primary Examiner* — Jay P Patel
(74) *Attorney, Agent, or Firm* — NSIP Law

(57) ABSTRACT

A method for simultaneously transmitting packets having different lengths to two or more users in a wireless communication system includes: generating the packets to transmit to the respective users, the packets containing information on the maximum transmission length of the packets having different lengths; and simultaneously transmitting the generated packets to the respective users. The maximum transmission length is represented by the number of sym-
(Continued)

bols, and each of the packets sequentially contains control information required for transmitting the packet, data, a tail field, and a PHY pad field, and is generated by inserting a MAC pad between the control information and the data such that the tail field and the PHY pad field are positioned at the last byte of the last symbol of the maximum transmission length.

20 Claims, 7 Drawing Sheets

Related U.S. Application Data continuation of application No. 13/047,477, filed on Mar. 14, 2011, now Pat. No. 9,167,476.

(51) Int. Cl.
<table>
<tr><td>H04W 4/06</td><td>(2009.01)</td></tr>
<tr><td>H04W 28/06</td><td>(2009.01)</td></tr>
<tr><td>H04L 12/741</td><td>(2013.01)</td></tr>
<tr><td>H04W 72/04</td><td>(2009.01)</td></tr>
<tr><td>H04L 29/06</td><td>(2006.01)</td></tr>
</table>

(52) U.S. Cl.
CPC ....... *H04W 28/06* (2013.01); *H04W 72/0406* (2013.01)

(56) References Cited

U.S. PATENT DOCUMENTS

<table>
<tr><td>8,054,813</td><td>B2</td><td>11/2011</td><td>Kim et al.</td><td></td></tr>
<tr><td>8,873,461</td><td>B2</td><td>10/2014</td><td>Kim et al.</td><td></td></tr>
<tr><td>2005/0141420</td><td>A1</td><td>6/2005</td><td>Li et al.</td><td></td></tr>
<tr><td>2007/0091932</td><td>A1</td><td>4/2007</td><td>Hwang</td><td></td></tr>
<tr><td>2007/0153757</td><td>A1</td><td>7/2007</td><td>Kim et al.</td><td></td></tr>
<tr><td>2007/0230493</td><td>A1</td><td>10/2007</td><td>Dravida et al.</td><td></td></tr>
<tr><td>2010/0014463</td><td>A1</td><td>1/2010</td><td>Nagai et al.</td><td></td></tr>
<tr><td>2010/0111203</td><td>A1</td><td>5/2010</td><td>Aoki et al.</td><td></td></tr>
<tr><td>2010/0128672</td><td>A1*</td><td>5/2010</td><td>Harada</td><td>H04W 28/065 370/328</td></tr>
<tr><td>2010/0128742</td><td>A1*</td><td>5/2010</td><td>Chun</td><td>H04L 12/1886 370/474</td></tr>
<tr><td>2010/0208749</td><td>A1*</td><td>8/2010</td><td>Chun</td><td>H04L 69/22 370/474</td></tr>
<tr><td>2010/0238931</td><td>A1*</td><td>9/2010</td><td>Meyer</td><td>H04L 69/22 370/392</td></tr>
<tr><td>2010/0278111</td><td>A1*</td><td>11/2010</td><td>Kashima</td><td>H04W 28/065 370/328</td></tr>
<tr><td>2010/0309834</td><td>A1</td><td>12/2010</td><td>Fischer et al.</td><td></td></tr>
<tr><td>2011/0134816</td><td>A1</td><td>6/2011</td><td>Liu et al.</td><td></td></tr>
<tr><td>2011/0134900</td><td>A1</td><td>6/2011</td><td>Liu et al.</td><td></td></tr>
<tr><td>2011/0199971</td><td>A1</td><td>8/2011</td><td>Kim et al.</td><td></td></tr>
<tr><td>2013/0272179</td><td>A1</td><td>10/2013</td><td>Liu et al.</td><td></td></tr>
<tr><td>2016/0119815</td><td>A1*</td><td>4/2016</td><td>Liu</td><td>H04L 1/06 370/329</td></tr>
</table>

FOREIGN PATENT DOCUMENTS

<table>
<tr><td>KR</td><td>10-2007-0041870 A</td><td>4/2007</td></tr>
<tr><td>KR</td><td>10-2007-0061064 A</td><td>6/2007</td></tr>
<tr><td>KR</td><td>10-2009-0006157 A</td><td>1/2009</td></tr>
<tr><td>KR</td><td>10-2009-0080551 A</td><td>7/2009</td></tr>
</table>

OTHER PUBLICATIONS

Korean Office Action issued on Jan. 6, 2017 in counterpart Korean Application No. 10-2011-0022318. (3 pages in Korean).

* cited by examiner

# METHOD AND APPARATUS FOR TRANSMITTING/RECEIVING PACKET IN WIRELESS COMMUNICATION SYSTEM

CROSS-REFERENCE TO RELATED APPLICATIONS

The present application is a continuation of U.S. patent application Ser. No. 14/882,712, filed on Oct. 14, 2015, which is a continuation of U.S. patent application Ser. No. 13/047,477, filed on Mar. 14, 2011, which claims priority of Korean Patent Application No. 10-2010-0022439, filed on Mar. 12, 2010, which are all incorporated herein by reference in their entirety.

BACKGROUND OF THE INVENTION

Field of the Invention

Exemplary embodiments of the present invention relate to a method and apparatus for transmitting/receiving packet in a wireless communication system.

Description of Related Art

While a variety of high-capacity multimedia services have been activated, the performance of a wireless communication system is not so high. Since multiple users share a wireless resource, the transmission rate of a wireless service, which is felt by the users, significantly decreases. Accordingly, research has been conducted on a variety of technologies which are to increase the performance of a wireless communication system for multiple users by increasing a bandwidth to expand the wireless resource shared by the multiple users or implementing a specific beam in communication with each of the users while using a wireless resource at the same bandwidth.

Since the medium access control (MAC) protocol of the wireless communication system operates based on carrier sense multiple access/collision avoidance (CSMA/CA), the MAC protocol contains a problem of resource waste which occurs during a channel contention process. In order to solve such a problem, burst transmission has been proposed. In the burst transmission, the enhanced MAC protocol defined in the IEEE 802.11e transmits multiple MAC protocol data units (MPDUs) at a short inter-frame space (SIFS) during a transmission opportunity (TXOP), when acquiring a transmission opportunity for a wireless resource, and receives a block ACK for the transmitted MPDUs. Furthermore, the IEEE 802.11n defines an aggregated MAC service data unit (A-MSDU) and an aggregated MPDU (A-MPDU), in order to aggregate MSDUs and MPDUs to transmit through one contention process for a wireless resource without an IFS.

According to the development trend of the above-described wireless communication system, the IEEE 802.11ac defines that a MAC service access point (MAC SAP) of an AP in a wireless communication system including one AP and two stations (STAs) should support the maximum performance of 1 Gbps and a MAC SAP of an STA for a point-to-point environment requires the maximum performance of 500 Mbps, in order to construct a high-speed wireless communication system. Furthermore, a characteristic in which the AP and the STA may simultaneously support the compatibility with the existing wireless communication system (IEEE 802.11a/n system) is defined as a requirement of the high-performance wireless communication system.

In a wireless communication system, an apparatus (AP or STA) which is to transmit data acquires a wireless channel, and then transmits data with information required for data transmission. A structure including data and information required for data transmission is referred to as a packet. At this time, the information required for data transmission is defined as an appointed value in a header.

FIG. 1 shows the format of a packet defined in the IEEE 802.11a. Data having a unit length of predetermined bytes are constructed with short/long training fields 110 and 120, a signal field 130, a service field 142, and tail/padding 144, which contain information required by a physical layer (PHY), and then transmitted to a receiver. The receiver receives data by using information acquired from the received fields. At this time, the data which are contained in a data field 140 with the service field 142 and the tail/padding 144 have a variable length within the maximum range.

FIG. 2 shows a packet having a mixed format which may be received by both of the IEEE 802.11a system and 802.11n system. Referring to FIG. 2, the packet having a mixed format includes a legacy field 210 consisting of a legacy-short training field (L-STF), a legacy-long training field (L-LTF), and a legacy-signal field (L-SIG) such that the 802.11a system may acquire information for receiving data. Furthermore, the packet includes a field 220 for the 802.11n system from a HT-SIG field such that the 802.11n system may acquire information required for receiving data.

As the wireless communication systems such as the 802.11a system and the 802.11n system define the packet formats as shown in FIGS. 1 and 2, there is demand for a packet format coinciding with a high-performance wireless communication system capable of simultaneously transmitting different packets to multiple users, for example, a wireless communication system based on multi-user multi-input multi-output (MU-MIMO).

SUMMARY OF THE INVENTION

An embodiment of the present invention is directed to a method and apparatus capable of simultaneously transmitting and receiving packets having different lengths to and from multiple users, in order to satisfy requirements by a high-performance wireless communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for simultaneously transmitting packets having different lengths to two or more users in a wireless communication system includes: generating the packets to transmit to the respective users, the packets containing information on the maximum transmission length of the packets having different lengths; and simultaneously transmitting the generated packets to the respective users. The maximum transmission length is represented by the number of symbols, and each of the packets sequentially contains control information required for transmitting the packet, data, a tail field, and a PHY pad field, and is generated by inserting a MAC pad between the control information and the data such that the tail field and the PHY pad field are positioned at the last byte of the last symbol of the maximum transmission length.

In accordance with another embodiment of the present invention, a method for receiving a packet from a transmitter which simultaneously transmits packets having different lengths to two or more users in a wireless communication system includes: receiving a packet containing information on the maximum transmission length of the packets having different lengths; and finding the position of a tail field contained in the received packet by using the information on the maximum transmission length, and processing the received packet. The maximum transmission length is represented by the number of symbols, and the received packet sequentially contains control information required for transmitting the received packet, data, the tail field, and a PHY pad field, and is generated by inserting a MAC pad between the control information and the data such that the tail field and the PHY pad field are positioned at the last byte of the last symbol of the maximum transmission length.

In accordance with another embodiment of the present invention, an apparatus for simultaneously transmitting packets having different lengths to two or more users in a wireless communication system includes: a packet generation unit configured to generate the packets to transmit to the respective users, the packets containing information on the maximum transmission length of the packets having different lengths; and a reception unit configured to simultaneously transmit the generated packets to the respective users. The maximum transmission length is represented by the number of symbols, and each of the packets sequentially contains control information required for transmitting the packet, data, a tail field, and a PHY pad field, and is generated by inserting a MAC pad between the control information and the data such that the tail field and the PHY pad field are positioned at the last byte of the last symbol of the maximum transmission length.

In accordance with another embodiment of the present invention, an apparatus for receiving a packet from a transmitter which simultaneously transmit packets having different lengths to two or more users in a wireless communication system includes: a reception unit configured to receive a packet containing information on the maximum transmission length of the packets having different lengths; and a packet processing unit configured to find the position of a tail field contained in the received packet by using the information on the maximum transmission length and process the received packet. The maximum transmission length is represented by the number of symbols, and the received packet sequentially contains control information required for transmitting the received packet, data, the tail field, and a PHY pad field, and is generated by inserting a MAC pad between the control information and the data such that the tail field and the PHY pad field are positioned at the last byte of the last symbol of the maximum transmission length.

BRIEF DESCRIPTION OF THE DRAWINGS

FIG. 1 shows the format of a packet defined in the IEEE 802.11a.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Exemplary embodiments of the present invention provide a method and apparatus for simultaneously transmitting/receiving packets having different lengths to multiple users in a wireless communication system. The embodiments of the present invention will be described based on a packet format which is to be used in a wireless communication system of the IEEE 802.11ac (also referred to as very high throughput (VHT) system), for convenience of explanation, and thus are not limited to the name of a specific wireless communication system. Therefore, the embodiments of the present invention may support a multi-channel environment in which data are transmitted/received at different frequencies and a wireless LAN (WLAN) system of the MU-MIMO system. Furthermore, it is possible to support a variety of high-speed wireless services based on the wireless communication system proposed by the embodiments of the present invention.

Figure 3:
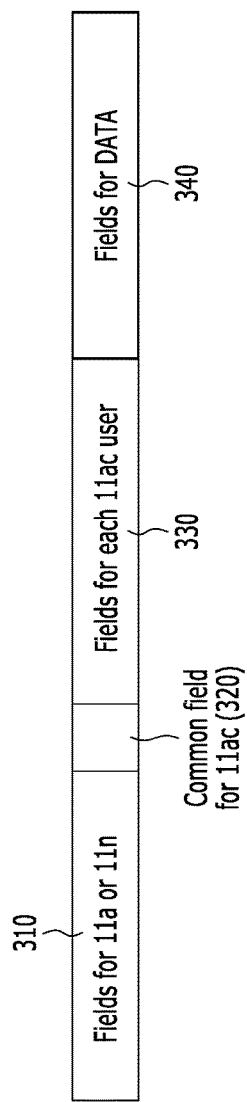
FIGS. 3 to 6 show the formats of packets in a wireless communication system in accordance with various embodiments of the present invention.

FIG. 3 shows the format of a packet for the wireless communication system of the IEEE 802.11ac in accordance with an embodiment of the present invention. The packet of FIG. 3 has a mixed format for compatibility with 802.11a/n, and includes a field 310 for 802.11a/n, fields 320 and 330 for 802.111ac, and a field 340 for data. The fields 320 and 330 for 802.11ac include a common field 320 for 802.11ac and a field 330 for each user of 802.11ac. The field 310 for 802.11a/n contains information which should be notified to each user of 802.11a/n. The common field 320 for 802.11ac contains information which should be commonly notified to multiple users of 802.11ac. The field 330 for each user of 802.11ac contains information which are to be transmitted to each user of 802.11ac. The data field 340 contains data which are to be transmitted to each user. The 802.11ac system may acquire necessary information through not only the fields 320 and 330 for 802.11ac but also the field 310 for 802.11a/n corresponding to the existing wireless communication system. Furthermore, the field 330 for each user of 802.11ac and the data field 340 may be provided in a different form to each user. For example, the formats and/or lengths of subfields of the fields 330 and 340 may be set in different manners for each user.

Figure 4:
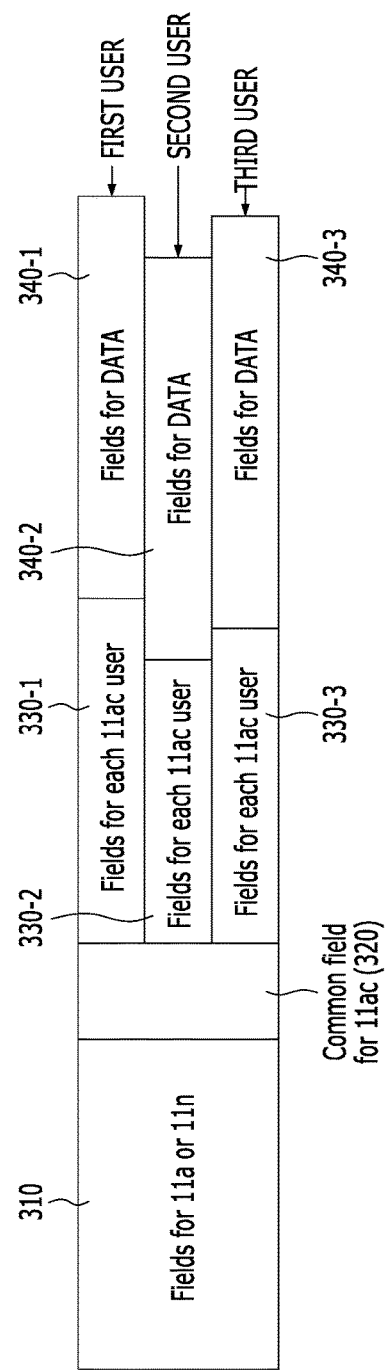
Figure 5:
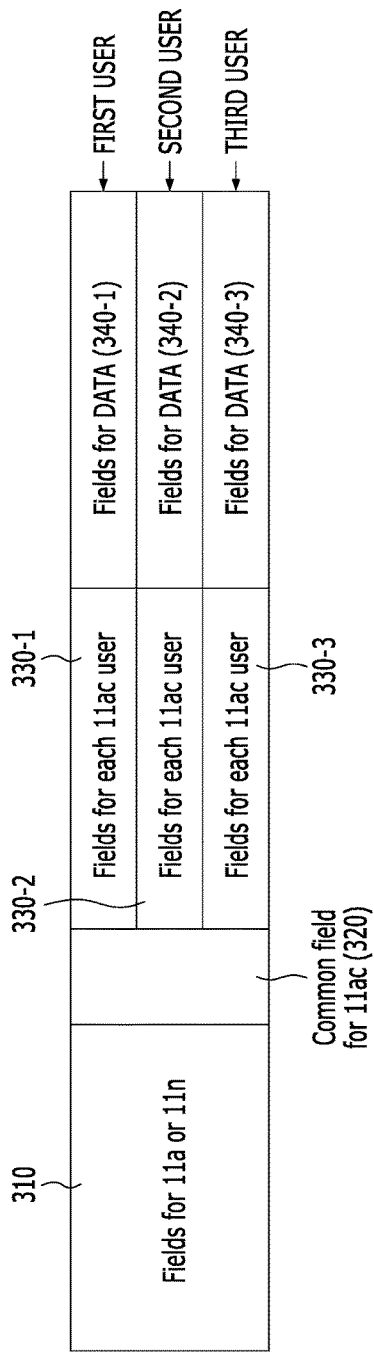
Figure 6:
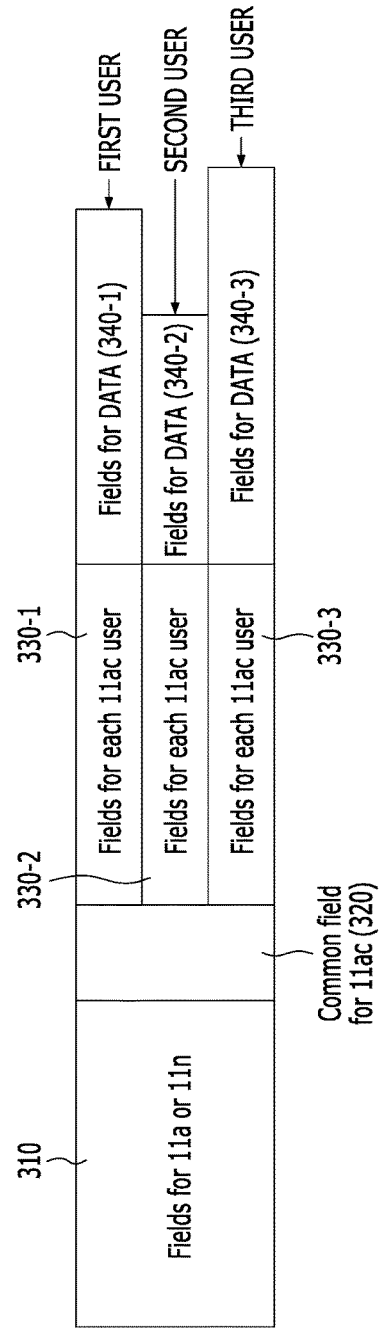

The field 330 for each user of 802.11ac may include training fields (referred to as VHT training fields) and a signal field (referred to as a VHT signal field), as in the IEEE 802.11a/n. Depending on whether a long training field (referred to as VHT LTF) of the VHT training fields is resolvable or non-resolvable, the field 330 for each user of 802.11ac may be constructed in different manners for each user. FIG. 4 shows an example in which the VHT LTF is resolvable. In FIG. 4, fields 330-1, 330-2, and 330-3 for the respective users of 802.11ac have different lengths, and fields 340-1, 340-2, and 340-3 for data may be not identical for the respective users or may be identical for the respective users. FIGS. 5 and 6 show an example in which the VHT LTF is non-resolvable. In FIGS. 5 and 6, the fields 330-1, 330-2, and 330-3 for the respective users of 802.11ac have the same length. FIG. 5 shows an example in which the fields have the same data length, and FIG. 6 shows an example in which the fields have different lengths.

Referring to FIGS. 3 to 6, the packet of the IEEE 802.11ac requires not only the fields for transmitting common information to the respective users but also the fields for transmitting different information. Therefore, a method for efficiently controlling the respective fields of VHT packets for multiple users and properly informing the respective users of different information is required.

As described above, the IEEE 802.11 legacy MAC in a wireless communication system transmits an MPDU including an MSDU, the IEEE 802.11 enhanced MAC transmits multiple MPDUs during a transmission opportunity (TXOP), and the HT (high throughput)-MAC transmits an A-MPDU, when acquiring a transmission opportunity of a wireless resource. In this embodiment of the present invention, when acquiring a transmission opportunity, a transmitter simultaneously transmits frames to multiple users based on the MU-MIMO technology. The transmission is defined as a MU-MIMO transmission unit (MU-MIMO TX unit) of the VHT-MAC protocol.

Furthermore, the VHT MAC in accordance with the embodiment of the present invention may transmit a single MSDU or MPDU, but may transmit an A-MPDU within a VHT packet, because the VHT MAC should support the performance of the HT-MAC or more. The method in accordance with the embodiment of the present invention may be supported in both of the above-described resolvable and non-resolvable examples.

Figure 7:
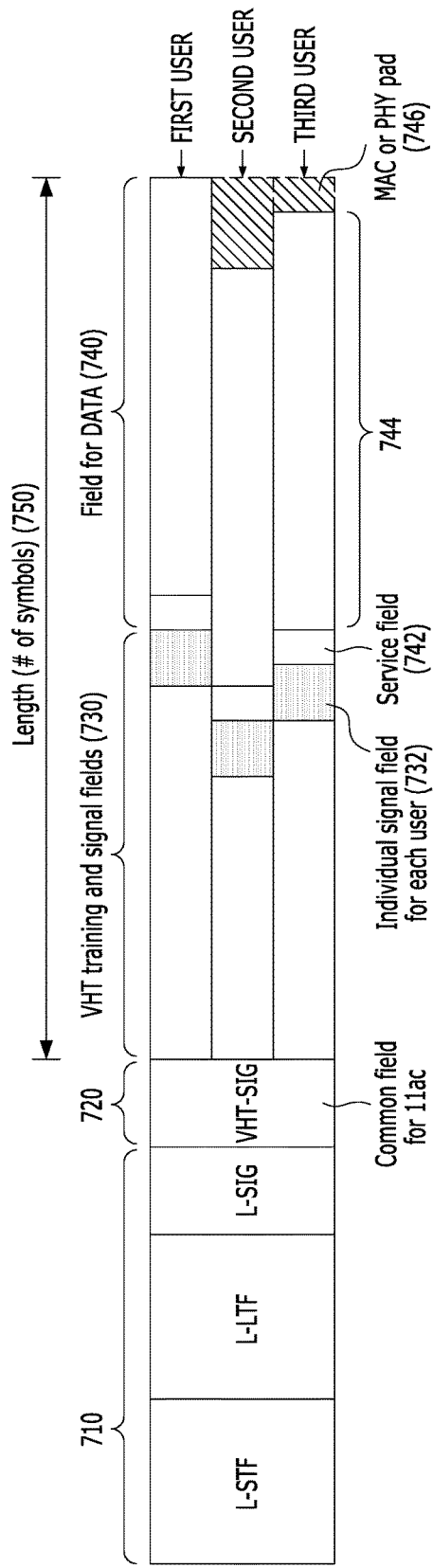
FIG. 7 specifically shows the packet format of FIG. 3 in accordance with an embodiment of the present invention.

FIG. 7 is a diagram specifically showing the packet format of FIG. 3 in accordance with an embodiment of the present invention. FIG. 7 shows a format for simultaneously transmitting packets having different lengths to multiple users. The packet of FIG. 7 may include a legacy field 710, a common field 720 having information which should be commonly noticed to multiple users of VHT, a field 730 having information which should be notified to each user of VHT, and a field 740 for data which are transmitted to each user. The common field 720 of VHT may include a signal field VHT-SIG which should be commonly notified to the multiple users of VHT. The field 730 having information which should be notified to each user of VHT may include a training field and a signal field 732 for each user of VHT.

At this time, the maximum length 750 of the packet which is simultaneously to multiple users may be notified to the respective users. The maximum length 750 of the packet may be represented by the unit of byte or symbol. In particular, since the length of the VHT training and signal fields 730 and the length and/or transmission modulation coding scheme (MCS) of the data field 740 may differ for each user, the maximum length 750 of the packet may be represented by the number of symbols. That is, since the transmission MCS for data transmitted to each user is different, the maximum length 750 is based on transmission time. Therefore, the maximum length 750 represents the maximum number of symbols required for transmitting the VHT training and signal fields 730 and the data field 740 which may differ for each user. In FIG. 7, since the number of symbols required for transmitting the VHT training and signal fields 730 and the data field 740 to a first user is the largest, the symbol number is decided as the maximum length 750. The information on the maximum length may be contained in the VHT-SIG 720, for example.

A variety of transmission information applied to each user may be contained in an individual signal field 732 existing in the VHT training and signal fields 730 transmitted to the user. Referring to FIG. 7, the individual signal field 732 may be positioned at the end of the VHT training and signal fields 730. In a modification, the individual signal field 732 may be positioned at the front or middle of the VHT training and signal fields 730.

Figure 1:
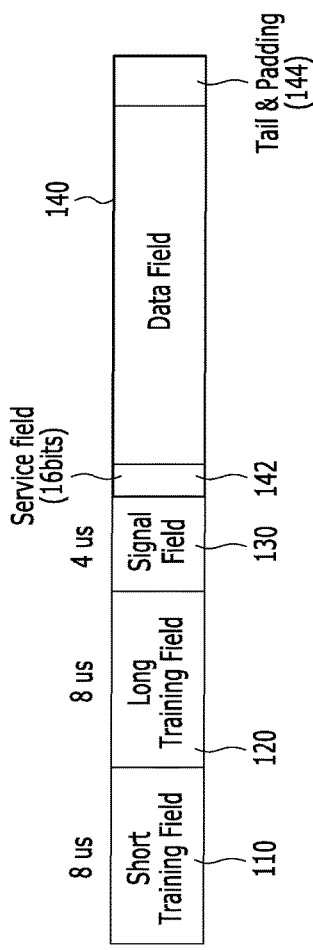
Figure 2:
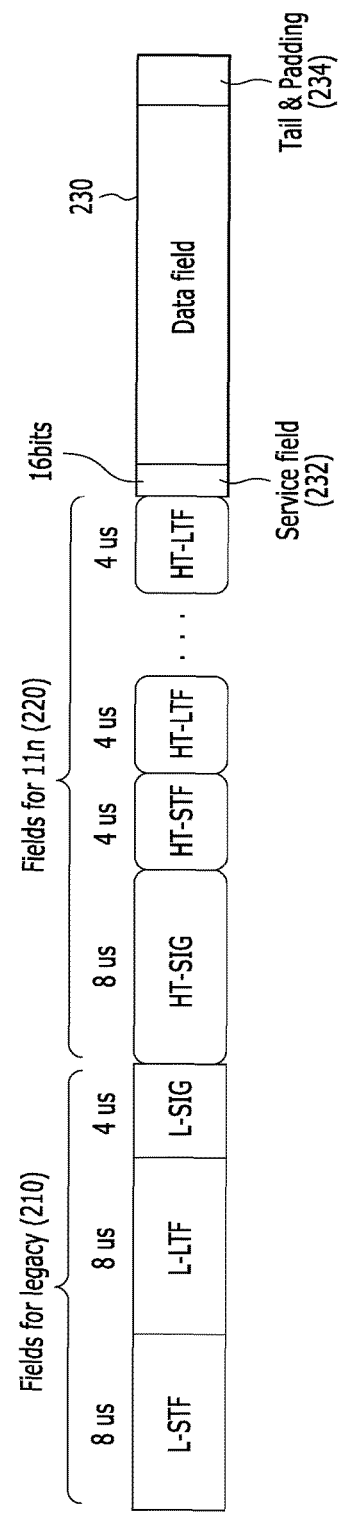
FIG. 2 shows a packet having a mixed format for both of the IEEE 802.11a system and 802.11n system.

Furthermore, a service field 742 of a physical layer (PHY) is positioned at the front of the data field 740 for data transmitted to each user. The position of the service filed 742 is identical to the position of the service fields 142 and 232 as shown in FIGS. 1 and 2. The service field 732 of FIG. 7 has a 16-bit value of '0' before being scrambled by a scrambler, and is then reset to a pseudo-random nonzero seed value, like the service field 232 of the HT packet having a mixed format in FIG. 2. At this time, a scrambler nonzero seed value consists of 9 bits, and the remaining 7 bits are left as reserved bits.

Meanwhile, the tail & pad fields 144 and 234 shown in FIGS. 1 and 2 follow the end of substantially significant data which are transmitted to a user (receiver), and are the last information of the data fields 140 and 230 which is required for receiving a packet and processing the received packet at the PHY of the user. For example, the tail field may be used for returning a convolution encoder to a state of "0", and the pad field may be used as dummy data for adjusting the preset size of a frame.

However, when the maximum length information 750 is notified as the number of symbols as assumed in the embodiment of the present invention and the byte-unit length information of a packet transmitted to each user is not provided, the PHY of the user cannot recognize the position of the last byte of significant data within a received packet. Therefore, it is impossible to recognize the accurate position of the tail & PHY pad field.

Accordingly, the embodiments of the present invention proposes a method capable of processing packets having different lengths, which are simultaneously transmitted to multiple users, without a change in the information of the tail & PHY pad field required for receiving the packets at the PHY of each of the users, even though the maximum length information 750 is notified as the number of symbols and the byte-unit length information of the packet transmitted to each user is not provided.

Figure 8:
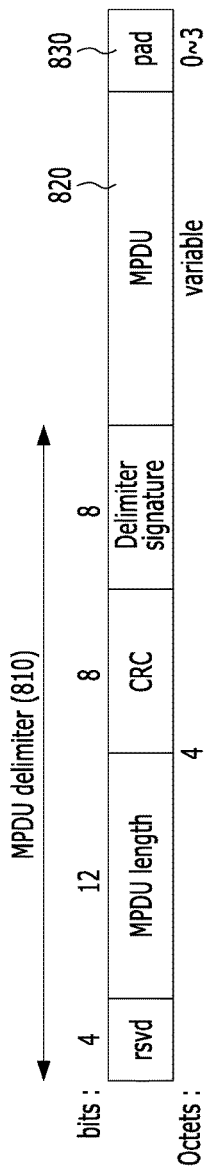
FIG. 8 shows the format of an A-MPDU subframe of the IEEE 802.11n.
Figure 9:
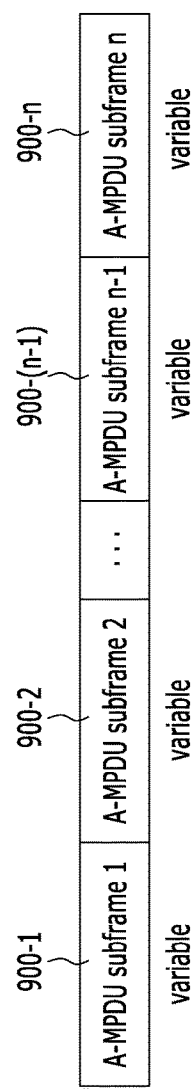
FIG. 9 shows the format of an A-MPDU frame of the IEEE 802.11n.

In order to examine the format of a VHT A-MPDU 744 in accordance with the embodiment of the present invention, the format of an A-MPDU defined in the IEEE 802.11n will be first described. Referring to FIG. 9, the A-MPDU frame of 802.11n includes one or more A-MPDU subframes 900-1, 900-2, . . . , 900-(n−1), and 900-n. At this time, referring to FIG. 8, each of the A-MPDU subframes 900-1, 900-2, . . . , 900-(n−1), and 900-n may include an MPDU delimiter 810, an MPDU 820, and a 0~3 pad 830. However, the last A-MPDU subframe 900-n of 802.11n does not additionally include the 0~3 pad 830. Here, the 0~3 pad is referred to as a 0~3 byte pad.

Figure 10:
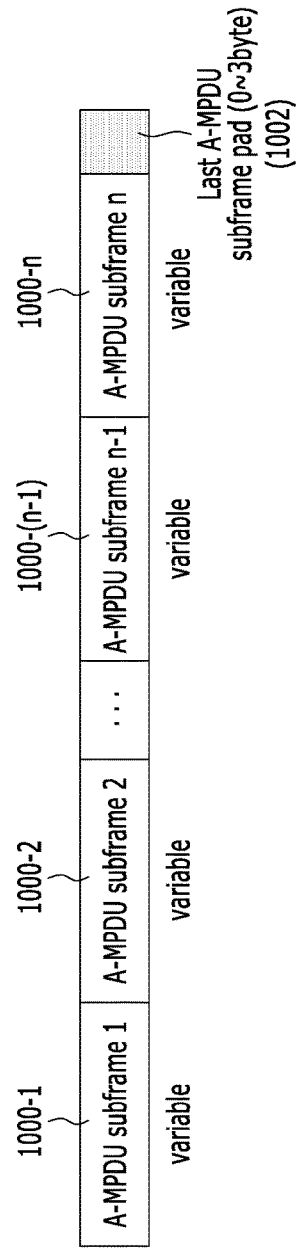
FIG. 10 is a diagram explaining the format of a VHT A-MPDU frame in accordance with the embodiment of the present invention.

The VHT A-MPDU frame in accordance with the embodiment of the present invention has the same format as that of the A-MPDU of 802.11n shown in FIG. 9, but the last A-MPDU subframe 1000-n additionally includes a 0~3 pad 1002, unlike the last A-MPDU subframe 900-n of 802.11n. That is, in the VHT system in accordance with the embodiment of the present invention, all the A-MPDU subframes 1000-1, 1000-2, . . . , 1000-(n−1), and 1000-n including the last A-MPDU subframe 1000-n may be processed by the unit of four bytes (refer to FIG. 10). In FIG. 10, the 0~3 pad is specified as the last A-MPDU subframe pad 1002. The VHT A-MPDU frame of FIG. 10 may have a different length for each user, and may be included in the data field 740 of FIG. 7.

Figure 11:
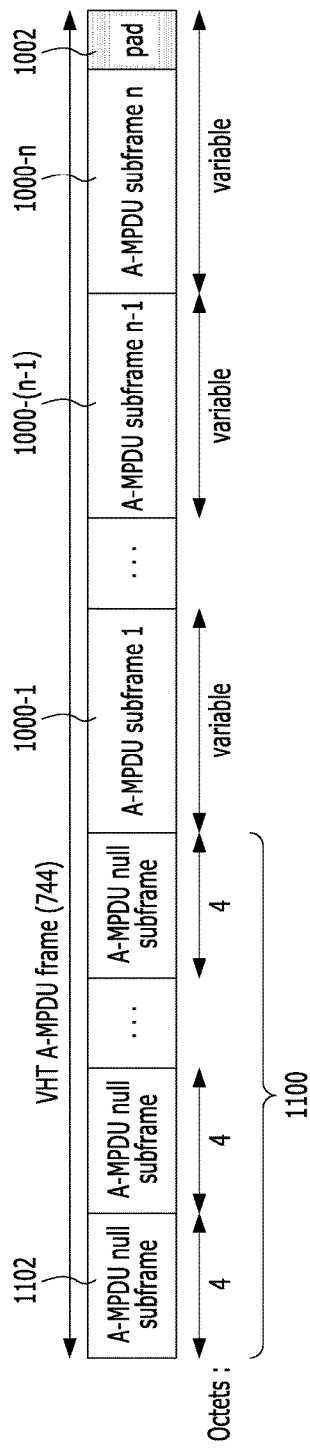
FIG. 11 shows the format of the format of the VHT A-MPDU frame in accordance with the embodiment of the present invention.

In the embodiment of the present invention, when packets having different lengths are simultaneously transmitted to multiple users, a service field 742 consisting of first two bytes of the PPUD data field 740 and a pre-pad field 1100 are added before the A-MPDU frame 1001-1 such that the PHY of each user properly acquires the end of the significant data (for example, the last A-MPDU subframe 1000-n) and the tail & PHY pad information. FIG. 11 shows the format of the VHT A-MPDU frame 744 in accordance with the embodiment of the present invention. The pre-pad field 1100 in accordance with the embodiment of the present invention includes one or more null delimiters 1102 of which the MPDU length is '0' within the MPDU delimiter 810, and the A-MPDU frames 1000-1, 1000-2, . . . , 1000-(n−1), and 1000-n of which the MPDU length is not '0' follow the pre-pad field 1100. At this time, a necessary number of null delimiters 1102 may be included to position the tail & PHY pad field 746 at the last byte of the last symbol.

As the VHT A-MPDU 744 for each user is constructed as shown in FIG. 11, the length of a packet transmitted to each user has the same transmission time (duration) as the symbol number of the maximum length 750.

In other words, when the packets for the first to third users have different lengths as shown in FIG. 7, the respective users (receivers) cannot find the tail & PHY pad field required for receiving a packet, in case where only the maximum length information 750 is notified and the byte length information on the packets of the respective users is not notified. In the embodiment of the present invention, however, the pad 1100 is inserted between the service field 742 which is the last information of the control information 710, 720, 730, and 740 required for transmitting/receiving a packet and the first data (for example, the first A-MPDU subframe 1000-1) such that the tail & pad field 746 is positioned at the last byte of the last symbol where the last A-MPDU subframe 1000-n is positioned. Therefore, each user may recognize the positions of the tail & pad field 746 and the last A-MPDU subframe 1000-n.

Figure 12:
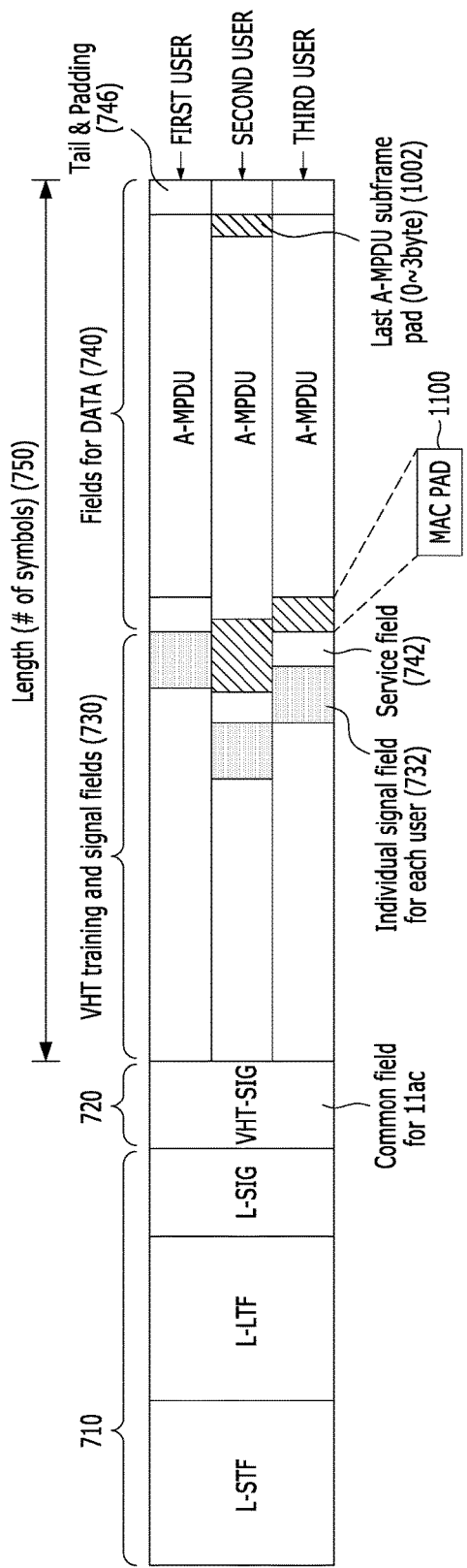
FIG. 12 shows an example in which the VHT A-MPDU frame shown in FIG. 11 is applied to simultaneously transmit packets having different lengths to multiple users.

FIG. 12 shows an example in which the VHT A-MPDU frame shown in FIG. 11 is applied to FIG. 7 to simultaneously transmit packets having different lengths to multiple users.

The VHT A-MPDU frame 744 defined in FIG. 11 basically maintains the A-MPDU frame format and the PSDU format of the PHY which are defined in the IEEE 802.11n. Therefore, the VHT A-MPDU frame may be easily applied without a specific change in the format thereof. Furthermore, it is possible to reduce overheads of specifying the maximum number of symbols in the common field 720 for the IEEE 802.11ac and separately notifying the length information of the packet discriminated for each user or the number of transmission symbols of the packet.

Furthermore, the order of the tail & PHY pad field does not need to be changed, but the PHY pad field may be positioned next to the tail field as in the IEEE 802.11n.

Figure 13:
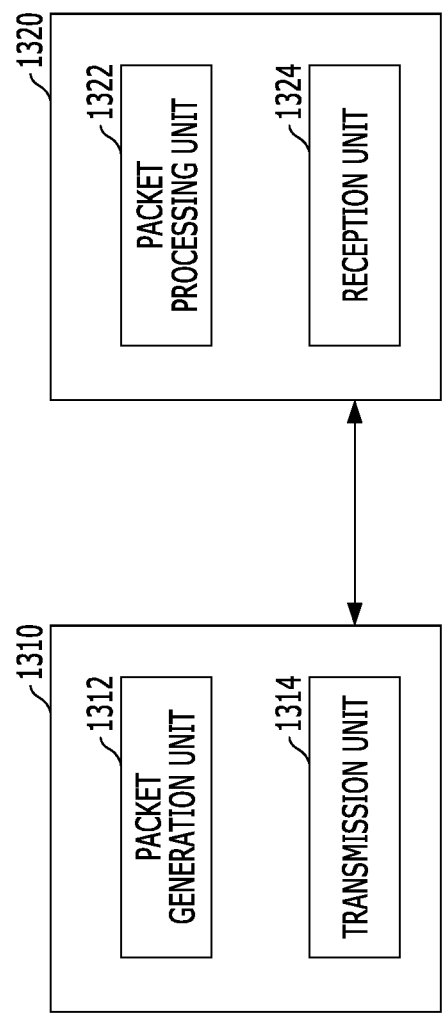
FIG. 13 is a diagram showing the configuration of a packet transmission apparatus and a packet reception apparatus in accordance with another embodiment of the present invention.

Hereafter, the configuration of a packet transmission apparatus 1310 capable of simultaneously transmitting packets having different lengths to multiple users in accordance with the above-described method and a packet reception apparatus 1320 capable of receiving such a packet from the packet transmission apparatus 1310 and processing the received packet will be described with reference to FIG. 13. Here, the duplicated descriptions of the above descriptions are omitted therein. An AP and STA of a wireless communication system may serve as the packet transmission apparatus or the packet reception apparatus.

The packet transmission apparatus 1310 includes a packet generation unit 1312 and a transmission unit 1314.

The packet generation unit 1312 is configured to generate different packets to transmit to multiple users, according to the above-described method.

The transmission unit 1314 is configured to simultaneously transmit the packets generated by the packet generation unit 1312 to multiple users (two or more packet reception apparatuses 1320).

The packet reception apparatus 1320 includes a reception unit 1324 and a packet processing unit 1322.

The reception unit 1324 is configured to receive a packet from the packet transmission apparatus 1310, and the packet processing unit 1322 is configured to process the packet received by the reception unit 1324 according to the above-described method.

In accordance with the embodiment of the present invention, when packets having different lengths are simultaneously transmitted/received to/from multiple users, packets having a shorter length than the maximum packet length may be properly processed based on the maximum packet length.

Furthermore, since the multi-antenna technology for supporting multiple users based on the wireless communication system proposed by the present invention may be configured dynamically depending on services, it is possible to expect that a variety of services will be supported and the performance will be improved.

While the present invention has been described with respect to the specific embodiments, it will be apparent to those skilled in the art that various changes and modifications may be made without departing from the spirit and scope of the invention as defined in the following claims.

What is claimed is:

1. A method for simultaneously transmitting a packet to a plurality of users in a wireless communication system, the method comprising:

generating, in a medium access control (MAC) layer, a plurality of data frames corresponding to the plurality of users respectively;

generating, in a physical layer, the packet including a plurality of legacy training fields, a first signal field for legacy, a second signal field for the plurality of users, a plurality of training fields for the plurality of users, a plurality of third signal fields corresponding to the plurality of users respectively, and the plurality of data frames; and transmitting, in the physical layer, the packet based on multi-user multi-input multi-output (MU-MIMO), wherein each data frame includes a service field, a plurality of data subframes, and a MAC pad, wherein a length of the packet is determined based on a length of the longest data frame among the plurality of data frames, wherein the packet includes first length information based on the length of the longest data frame among the plurality of data frames and second length information based on a length of a data frame among the plurality of data frames, and wherein a transmission of the second signal field is followed by a transmission of the plurality of training fields.

2. The method of claim 1, wherein the first signal field includes the first length information.

3. The method of claim 1, wherein the second signal field includes the first length information.

4. The method of claim 1, wherein each third signal field of the plurality of third signal fields includes the second length information for a corresponding data frame among the plurality of data frames.

5. The method of claim 1, wherein the service field is scrambled by a scrambler based on a pseudo random non-zero seed.

6. The method of claim 1, wherein the plurality of legacy training fields comprises a legacy short training field and a legacy long training field.

7. The method of claim 1, wherein the MAC pad is positioned after a last data subframe among the data subframes and is an integer number of bytes in length, which is from 0 to 3.

8. The method of claim 1, wherein the MAC pad comprises an aggregated MAC protocol data unit (A-MPDU) subframe of which the MPDU length is 0.

9. The method of claim 1, wherein the transmission of the plurality of training fields is positioned between the transmission of the second signal field and a transmission of the third signal fields.

10. The method of claim 9, wherein the transmission of the plurality of training fields is followed by the transmission of the third signal fields.

11. A method for receiving a packet from a transmitter which simultaneously transmits the packet to a plurality of users in a wireless communication system, the method comprising:

receiving based on multi-user multi-input multi-output (MU-MIMO), in a physical layer, a packet containing a plurality of legacy training fields, a first signal field for legacy, a second signal field for the plurality of users, a plurality of training fields for the plurality of users, a plurality of third signal fields corresponding to the plurality of users respectively, and a plurality of data frames corresponding to the plurality of users respectively, wherein a length of the packet is determined based on a length of the longest data frame among the plurality of data frames, and the packet includes first length information based on the length of the longest data frame and second length information based on a length of a data frame for a respective user;

finding, in the physical layer, the first length information and the second length information; and processing, in a medium access control (MAC) layer, the data frames, wherein each data frame includes a service field, a plurality of data subframes and a MAC pad, and wherein a position of the second signal field is followed by a position of the plurality of training fields in the packet.

12. The method of claim 11, wherein the first signal field includes the first length information.

13. The method of claim 11, wherein the second signal field includes the first length information.

14. The method of claim 11, wherein each third signal field of the plurality of third signal fields includes the second length information for a corresponding data frame among the plurality of data frames.

15. The method of claim 11, wherein the service field is scrambled by a scrambler based on a pseudo random non-zero seed.

16. The method of claim 11, wherein the plurality of legacy training fields comprises a legacy short training field and a legacy long training field.

17. The method of claim 11, wherein the MAC pad is positioned after a last data subframe among the data subframes and is an integer number of bytes in length, which is from 0 to 3.

18. The method of claim 11, wherein the MAC pad comprises an A-MPDU subframe of which the MPDU length is 0.

19. The method of claim 11, wherein the plurality of training fields are positioned between the second signal field and the third signal fields in the packet.

20. The method of claim 19, wherein a position of the plurality of training fields is followed by a position of the third signal fields in the packet.

* * * * *